April 11, 1961

G. ROSNIANSKY 2,979,348

SEAL

Filed May 23, 1958

GEORGES ROSNIANSKY
INVENTOR.

BY Daniel H. Bobis
Atty.

United States Patent Office 2,979,348
Patented Apr. 11, 1961

2,979,348

SEAL

Georges Rosniansky, New York, N.Y., assignor to Worthington Corporation, Harrison, N.J., a corporation of Delaware Filed May 23, 1958, Ser. No. 737,418

4 Claims. (Cl. 286—11.14)

This invention relates to a sealing device and more particularly to a cartridge type sealing device which is entirely self-contained and accordingly can be inserted in a compressor or the like without any specialized preparation of the compressor.

The sealing action in devices of the character contemplated by this invention is formed by oppositely abutting faces of stationary and rotating sealing means. One of the disadvantages of prior art devices resulted from the cocking action imparted, on start-up of the compressor or the like, to the rotating member thereby braking the seal formed by the respective faces of the stationary and rotating seal means and thusly rendering the seal inoperative in its sealing function.

Accordingly, it is one object of this invention to provide a sealing device wherein the cocking action imparted to the rotating member is substantially eliminated.

It is another object of this invention to provide a sealing device which is simple in construction yet strong and durable and which will preclude fluid leakage between the sealing face thereof.

Still another object is the provision of means for maintaining the sealing means of the device in fluid-tight engagement regardless of irregularities that may occur during the operation thereof.

A still further object of this invention is the provision of a cartridge type seal which includes means for constraining the elements thereof in operable position when the said device is in storage.

With these and other objects in view, as may appear from the accompanying specification, the invention consists of various features of construction and combination of parts, which will be first described in connection with the accompanying drawings, showing a cartridge type seal of a preferred form embodying the invention, and the features forming the invention will be specifically pointed out in the claims.

Figure 1:
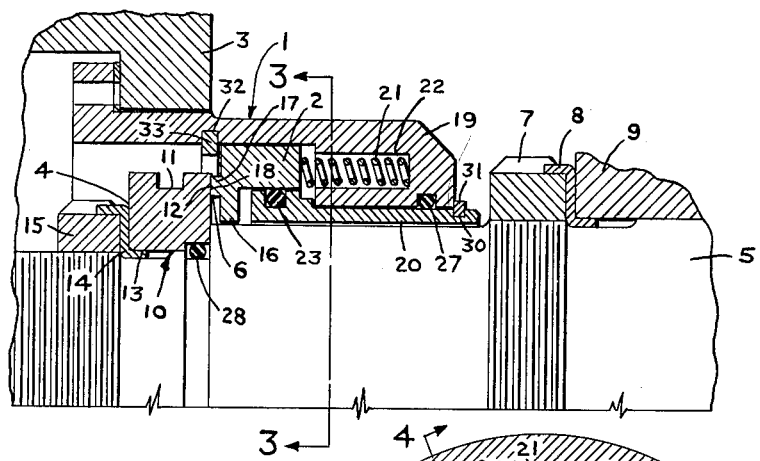
Figure 1 represents a part section of the novel seal taken on the longitudinal axis of the seal and coacting shaft.
Figure 3:
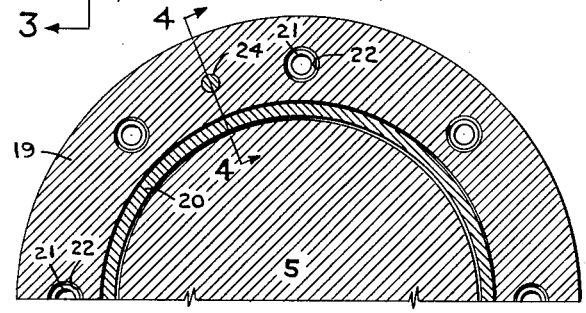
Figure 3 is a part section taken on line 3—3 of Figure 1 showing the means for maintaining the sealing means in fluid-tight engagement.

Referring now more particularly to the drawings, a seal generally designated 1 is shown and includes a stationary portion 2 which is affixed to the casing 3 (shown in part) of a compressor or the like in any convenient manner and a rotating portion 4 fixedly mounted about one end of the shaft 5 and coacting with the stationary portion in face-engaging relation to provide a face 6 which prevents fluid migration therethrough. In addition, provisions taking the form of a lock-nut 7, a lock washer 8, and an impeller bushing 9 are made on the shaft 5 for accommodating an impeller (not shown).

The portion of the seal 1 comprising the rotating means includes a seal means 10 which takes the form of an annular ring including an annular recess 11 in the outer periphery thereof and provides a face 12 which coacts with the stationary portion 2 to preclude commingling of the fluids in the compressor. This rotating seal means is fixedly mounted on the shaft 5 and securely held in operable position with the provision of locking means 13 shown in Figure 1 as a lock washer 14 and lock-nut 15.

The portion of the seal 1 comprising the stationary portion includes a sealing means 16 which usually takes the form of a carbon ring having a nose portion 17 characterized by its narrow face 18 which abuts the face portion of the rotating seal means 10. The stationary seal means 16 is disposed between a main housing 19 and a secondary housing 20 and held in face-engaging relation by a plurality of tension means 21 taking the form of springs of low modulus which permit the retention of even sealing face loadings and the maintenance of wide assembly tolerances and which springs are disposed in equidistantly spaced bores 22 formed in the main housing 19.

To coact with the fluid sealing face 6 and to prevent the commingling of the fluids in the machine a sealing gland member 23 taking the form of an O-ring is disposed in the secondary seal housing 20 and as close as practicable to the face 6 formed by the stationary and rotating seal means. This proximate disposition of the O-ring tends to reduce the cocking action imparted to the stationary ring on start-up of the compressor or the like.

To further reduce the cocking moment and in addition to preclude the relative rotation of the carbon ring 16 pin means 24 are provided therefore, one end of said pin means 25 being disposed in a bore 26 formed in the carbon ring and the other respective end being fixedly disposed in the main housing 19. Said another way, locating the vertical centerline of the ball end of pin means 25 in the vertical plane passing through the vertical centerline of the gland 23 serves to further reduce the cock-action imparted to the stationary ring as above described. Providing a ball end of the portion of the pin disposed in carbon ring 16 precludes breakage of the carbon ring in the event of cocking thereof as was the case heretofore.

To further insure against a commingling of the fluids working in the compressor another sealing gland member 27 also taking the form of an O-ring is disposed in an annular recess formed near the end of the main housing 20.

Similarly, another sealing gland member 28 is disposed between the rotating seal means 10 and the shaft 5.

In addition and to prevent the occurrence of irregularities that will disrupt the relative position of the elements comprising the seal, means are formed on the secondary seal housing to preclude the axial movement thereof during the operation of the compressor or the like. The foregoing means includes a shoulder 29 formed on one portion of the secondary housing and a recess 30 formed on another portion having a snap ring 31 disposed therein which coacts with the shoulder 29 to maintain the secondary housing in operable position.

The seals of the character contemplated by this invention are readily assembled and it is believed that the manner of assembly is readily understood from the foregoing description. However, because these seals are mass-produced means must be provided therefore to maintain the component elements thereof in operating position during the transporting and storage thereof. This is accomplished with the provision of a recess 32 in the main housing 19 which accommodates a retaining ring 33 which abuts the carbon ring 16 to thereby hold the elements of the seal in cartridge relationship and therefore provide for the convenient storage and transportation thereof.

Figure 2:
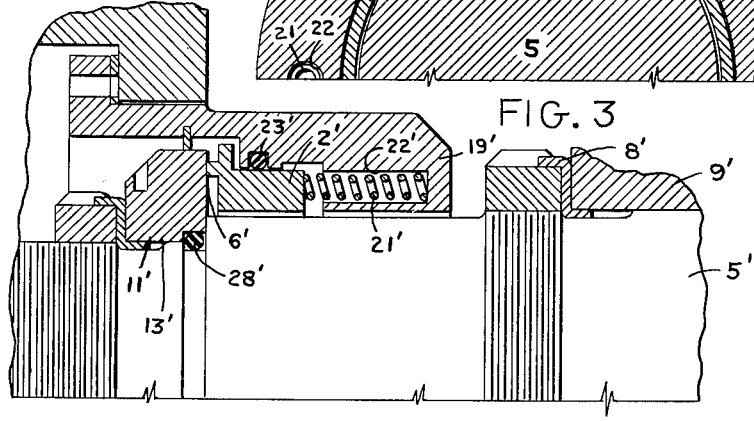
Figure 2 represents a part section of a seal of the same type shown in Figure 1 showing a modified form of the present invention.
Figure 4:
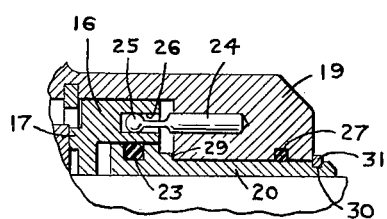
Figure 4 is a part section taken on line 4—4 of Figure 3 showing the preferred arrangement for eliminating the cocking action imparted to the sealing faces.

In Figure 2 an application of the principles of this invention are shown with reference to a modified form of seal, in which the secondary seal housing of Figure 1 has been eliminated and which comprises a stationary portion 2' including a sealing means 11' which usually takes the form of a carbon ring similar to that described hereinabove and which is held in position by a plurality of tension means 21' disposed in equidistantly spaced bores 22' formed in the main housing 19'.

As was the case with seal of Figure 1 sealing gland members 28' and 23' are arranged as was hereinbefore described to coact with the face 6' to preclude a commingling of the fluids operating in the compressor.

Pin means are also disposed in similar fashion as the pin means of Figure 1 to preclude the irregular cocking action of prior art type seals.

From the foregoing description it will be understood that the invention is not necessarily limited to the specific construction or arrangement of parts shown but that they may be widely modified within the invention defined by the claims.

What is claimed is:

1. A seal unit of the cartridge type comprising a main housing including a rotatable shaft, stationary and rotating seal means disposed around said shaft and in face-engaging relation with each other to preclude leakage therebetween, a plurality of tension means in said main housing and operatively abutting said stationary seal means for maintaining said stationary seal means in face-engaging relation with said rotating seal means, a secondary housing around said shaft and disposed in said main housing, first and second sealing gland members disposed around said secondary housing and on one side of the face formed by the stationary and rotating seal means, a third sealing gland member on the other side of said face formed by the stationary and rotating seal means and disposed around the rotatable shaft, pin means disposed with the axis thereof being parallel to the shaft axis and said pin means having one end mounted in said main housing and the other end thereof comprising a ball being disposed within said stationary seal to prevent axial rotation thereof relative said shaft, and the vertical centerline of the ball end of the pin means passing through the vertical centerline of the second sealing gland member.

2. The seal claimed in claim 1 including locking means mounted in said main housing and in abutment with the rotating seal means for maintaining the seal in assembled relationship.

3. A seal unit of the cartridge type comprising a housing including a rotatable shaft, stationary and rotating seal means disposed around said shaft and in face-engaging relationship with each other to preclude leakage therebetween, a plurality of tension means in said main housing and operatively abutting said stationary seal means for maintaining said stationary seal means in face-engaging relation with said rotating seal means, a first sealing gland disposed between said rotating seal means and said shaft, a second sealing gland member for said seal unit and disposed between said housing and said stationary seal means, pin means disposed with the axis thereof being parallel to the shaft axis and said pin means having one end mounted in said main housing and the other end thereof comprising a ball being disposed within said stationary seal to prevent axial rotation thereof relative said shaft, and the vertical centerline of the ball end of the pin means passing through the vertical centerline of the second sealing gland member.

4. The seal claimed in claim 3 including locking means mounted in said main housing and in abutment with the rotating seal means for maintaining the seal in assembled relationship.

References Cited in the file of this patent

UNITED STATES PATENTS

| | | |
|---|---|---|
| 2,247,505 | Kohler | July 1, 1941 |
| 2,362,436 | Stratford | Nov. 7, 1944 |
| 2,504,937 | Payne | Apr. 18, 1950 |
| 2,653,837 | Voytech | Sept. 29, 1953 |
| 2,672,357 | Voytech | Mar. 16, 1954 |
| 2,706,652 | Berger | Apr. 19, 1955 |
| 2,835,515 | Solari | May 20, 1958 |